US010455814B2

(12) United States Patent
Brandjes

(10) Patent No.: US 10,455,814 B2
(45) Date of Patent: Oct. 29, 2019

(54) FLEA COLLAR FOR PETS

(71) Applicant: Coastal Pet Products, Inc., Alliance, OH (US)

(72) Inventor: John W. Brandjes, Alliance, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 106 days.

(21) Appl. No.: 15/292,229

(22) Filed: Oct. 13, 2016

(65) Prior Publication Data

US 2018/0103616 A1    Apr. 19, 2018

(51) Int. Cl.
*A01K 27/00*    (2006.01)

(52) U.S. Cl.
CPC ................... *A01K 27/007* (2013.01)

(58) Field of Classification Search
CPC .... A01K 27/007; A01K 27/008; A44C 25/00; A44C 25/001; A44C 25/008; A44C 5/185
USPC ........................ 119/654; 63/23, 40
See application file for complete search history.

(56) References Cited

U.S. PATENT DOCUMENTS

| 1,906,043 | A | * | 4/1933 | Bernstein | A01K 27/002 119/856 |
| 2,187,021 | A | * | 1/1940 | Everson | A01K 27/002 119/792 |
| 2,219,569 | A | * | 10/1940 | VanDerhoof | A01K 27/007 119/654 |
| 2,498,685 | A | * | 2/1950 | Hyman | A41F 9/002 2/321 |
| 2,587,126 | A | * | 2/1952 | Ellington | A41F 3/00 2/301 |
| 2,705,328 | A | * | 4/1955 | Felix | A41F 9/002 2/236 |
| 3,477,409 | A | * | 11/1969 | Costanzo | A01K 27/007 119/174 |
| 3,623,481 | A | * | 11/1971 | Curran | A61H 23/0263 601/136 |
| 3,718,241 | A | * | 2/1973 | Forsythe | A41F 9/002 224/250 |
| 4,091,766 | A | * | 5/1978 | Colliard | A01K 27/005 119/858 |
| 4,141,322 | A | * | 2/1979 | Evans | A01K 27/007 119/654 |
| 4,184,452 | A | * | 1/1980 | Buzzell | A01K 27/007 119/654 |
| 4,218,991 | A | * | 8/1980 | Cole | A01K 27/007 119/654 |

(Continued)

FOREIGN PATENT DOCUMENTS

| CA | 2920302 A1 | * | 8/2016 | ............... A45F 5/02 |
| FR | 2728431 A1 | * | 6/1996 | ........... A01K 27/007 |

(Continued)

*Primary Examiner* — Magdalena Topolski
*Assistant Examiner* — Morgan T Barlow
(74) *Attorney, Agent, or Firm* — Renner, Kenner, Greive, Bobak, Taylor & Weber; Edward Greive; Tama Drenski

(57) ABSTRACT

A pet collar (10) includes a first elongate strap (14) and a plurality of retainers (13) which are carried by the strap (14). The retainers (13) receive a second elongate strap (12) which can be of a material such as found in a conventional flea collar. When positioned on the pet, the first strap (14) hides the second strap (12) so that it is not apparent that the pet is wearing the second strap (12).

6 Claims, 5 Drawing Sheets

(56) References Cited

U.S. PATENT DOCUMENTS

| | | | | |
|---|---|---|---|---|
| 4,266,511 A * | 5/1981 | Muench | A01K 27/006 | 119/654 |
| 4,709,539 A * | 12/1987 | Bird | B68C 1/14 | 54/23 |
| 4,841,915 A * | 6/1989 | Rocchetti | A01K 27/00 | 119/864 |
| 5,003,756 A * | 4/1991 | Mazzotta, Sr. | A01K 27/007 | 119/654 |
| 5,031,420 A * | 7/1991 | Song | A44C 3/008 | 63/21 |
| 5,044,114 A * | 9/1991 | Haberer | A01K 13/003 | 119/654 |
| 5,109,803 A * | 5/1992 | Dunham | A01K 27/007 | 119/654 |
| 5,233,942 A * | 8/1993 | Cooper | A01K 27/008 | 119/792 |
| 5,297,514 A * | 3/1994 | Stout | A01K 27/005 | 119/863 |
| 5,329,885 A * | 7/1994 | Sporn | A01K 27/002 | 119/792 |
| 5,370,286 A * | 12/1994 | Newman | A45F 3/14 | 119/857 |
| 5,529,019 A * | 6/1996 | Ekholm | A01K 27/007 | 119/654 |
| 5,555,848 A * | 9/1996 | Trujillo | A01K 27/007 | 119/654 |
| 5,970,921 A * | 10/1999 | Fulton | A01K 13/006 | 119/792 |
| D431,696 S * | 10/2000 | Constantino | D30/152 | |
| 6,234,118 B1 * | 5/2001 | Lahens | A01K 27/007 | 119/654 |
| 7,117,659 B1 * | 10/2006 | Grogoza | A01K 27/005 | 54/79.4 |
| 7,240,517 B2 * | 7/2007 | Barak | A44C 17/0283 | 206/6.1 |
| D552,805 S * | 10/2007 | Holt, Jr. | A01K 27/00 | D30/152 |
| 7,780,972 B2 * | 8/2010 | Hurwitz | A01N 25/34 | 424/411 |
| 8,393,016 B2 * | 3/2013 | Wilkins-Gaudio | A41F 9/002 | 2/312 |
| D777,997 S * | 1/2017 | Ruiz | A01K 27/002 | D30/145 |
| 2005/0199002 A1 * | 9/2005 | Barak | A44C 17/0283 | 63/13 |
| 2006/0217014 A1 * | 9/2006 | Pierce, Jr. | B63C 9/155 | 441/123 |
| 2007/0245979 A1 * | 10/2007 | Millan | A01K 27/002 | 119/864 |
| 2008/0008731 A1 * | 1/2008 | Hurwitz | A01K 27/007 | 424/409 |
| 2013/0139300 A1 * | 6/2013 | Laiken | A44B 11/006 | 2/321 |
| 2013/0152278 A1 * | 6/2013 | Machado | A41F 9/00 | 2/311 |
| 2013/0340145 A1 * | 12/2013 | Cooper | A41F 9/007 | 2/312 |

FOREIGN PATENT DOCUMENTS

| | | | | |
|---|---|---|---|---|
| GB | 656341 A * | 8/1951 | | A44C 5/185 |
| JP | 2005224493 A * | 8/2005 | | A44C 25/001 |
| WO | WO-0030434 A1 * | 6/2000 | | A01K 27/006 |
| WO | WO-2010116358 A2 * | 10/2010 | | A01K 27/007 |
| WO | WO-2014032075 A1 * | 3/2014 | | A44C 5/0084 |

* cited by examiner

FLEA COLLAR FOR PETS

TECHNICAL FIELD

This invention relates to a flea collar as worn by dogs or other pets. More specifically, this invention relates to a pet collar which has the attributes of a conventional pet collar and the benefits of a flea collar.

BACKGROUND ART

Collars are placed on pets so that a leash or the like may be attached thereto for the control of the pet. Such collars are usually quite ornamental based on the preferences of the proud pet owner.

Many pets are in need of the protection afforded by flea collars. Such collars are not at all ornamental, nor can a leash be attached thereto. Rather, they perform the function of ridding or repelling fleas, ticks, or the like to protect the pet. Thus, in order to so protect the pet, a second collar, that is, the flea collar, must be attached to the pet in addition to the regular collar. Such is often disturbing to the proud pet owner who would not like to see his or her pet with an unattractive collar. Moreover, a detectable presence of a flea collar suggests to the viewer that the pet may have a problem with fleas or ticks resulting in other pet owners making sure that their pet does not encounter the pet with a flea collar.

Thus, the need exists for a flea collar that is not unsightly and which can be worn by the pet without being exposed.

DISCLOSURE OF THE INVENTION

It is an object of one aspect of the present invention to provide a pet collar with flea protection which cannot readily be identified as a flea collar.

It is an object of another aspect of the invention to provide a collar, as above, which can be as ornamental as desired by the pet owner.

It is an object of an additional aspect of the present invention to provide a collar, as above, which combines the aesthetics of a conventional collar with the protection of a conventional flea collar.

It is an object of a further aspect of the present invention to provide a retainer for use on the pet collar, as above, to hold the conventional flea collar on the conventional collar.

It is an object of a still further aspect of the present invention to provide a method of constructing the collar utilizing a conventional collar, a conventional flea collar, and the retainer of the present invention.

These and other objects of the present invention, as well as the advantages thereof over existing prior art forms, which will become apparent from the description to follow, are accomplished by the improvements hereinafter described and claimed.

In general, a collar for an animal includes a first elongate strap and a plurality of retainers spaced along it. The retainers are adapted to receive a second elongate strap.

According to another aspect of the invention, a collar for an animal includes a first elongate strap of material. A plurality of retainers are received on the first strap. A second elongate strap of material is carried by the retainers and is of a different material than the first strap.

In accordance with another aspect of the invention, a retainer for connecting two elongate straps of material includes a first strap-receiving portion and a second strap-receiving portion connected to the first strap-receiving portion.

A method of making a collar of the present invention using the retainers of the present invention includes the steps of forming a first elongated strap of material, positioning a plurality of the retainers on the first elongate strap of material, and using the retainers to attach a second elongate strap of a different material to the first elongate strap of material.

A preferred exemplary collar with retainer according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
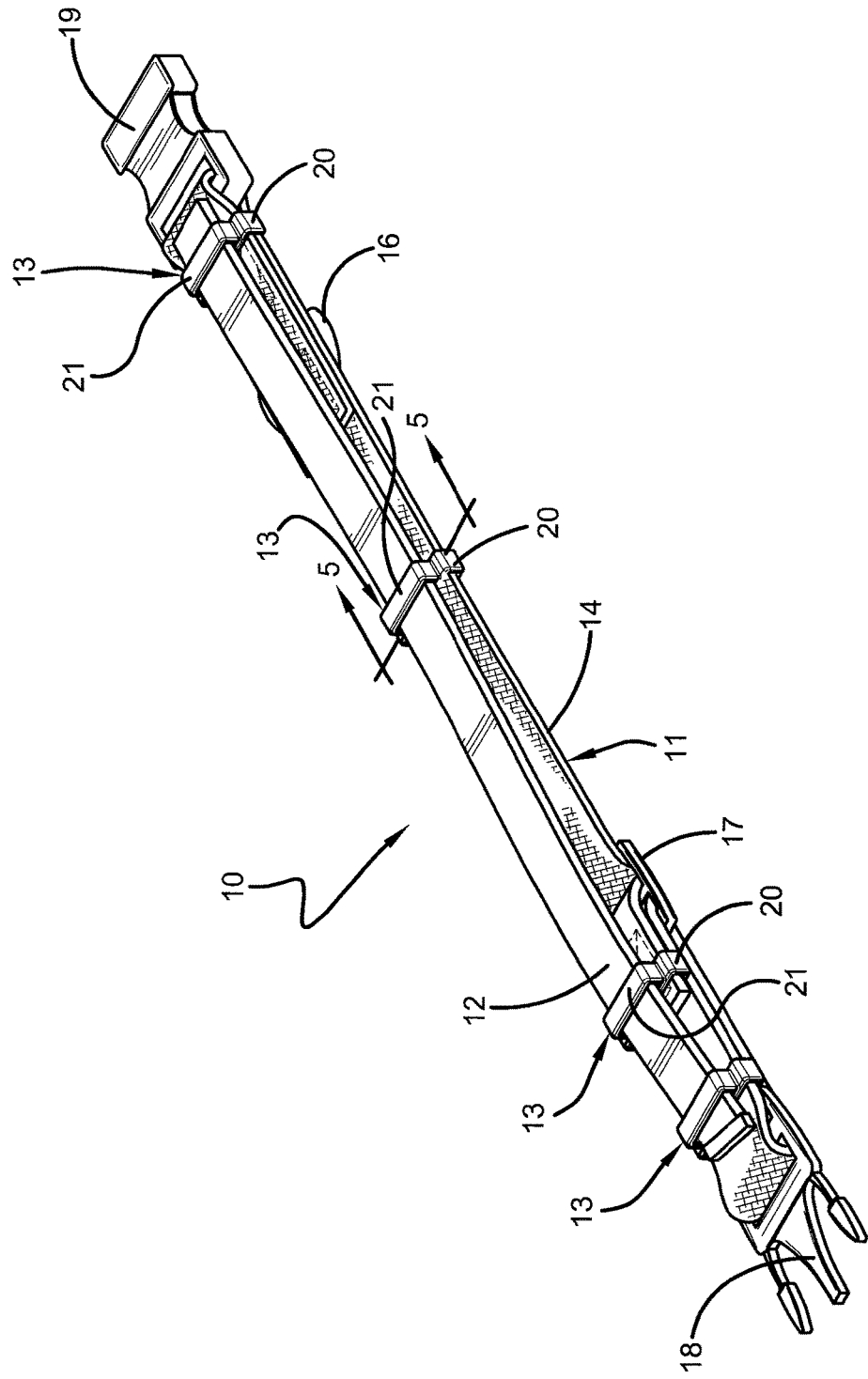
FIG. 1 is a perspective view of a pet collar made in accordance with the present invention.
Figure 2:
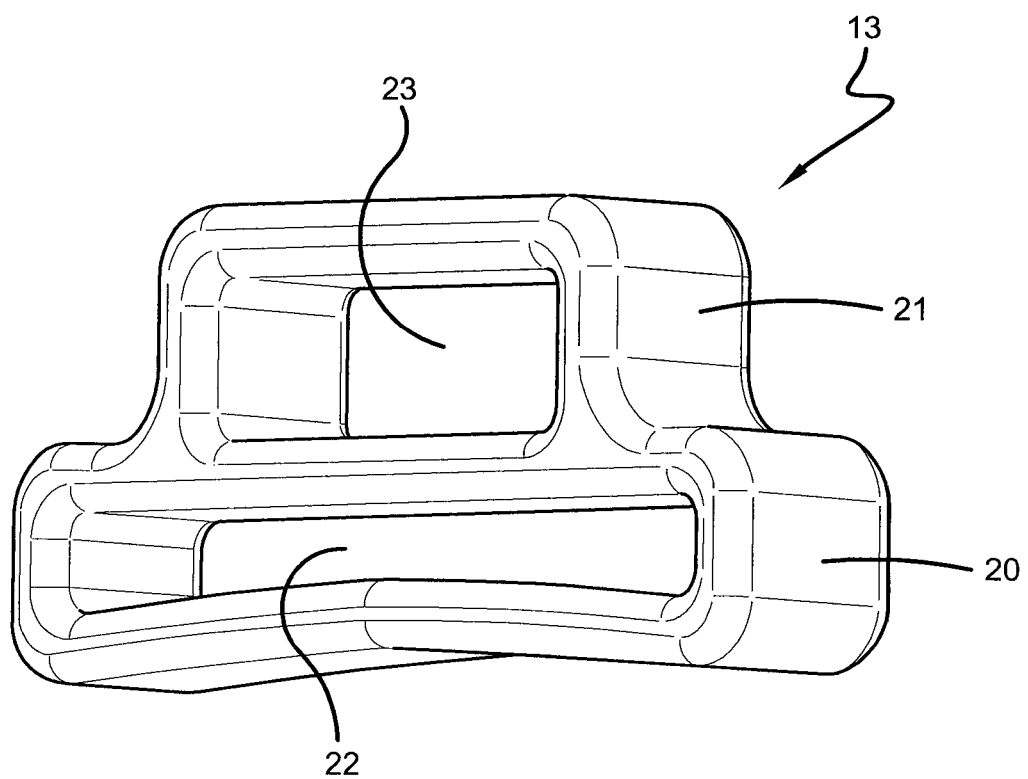
FIG. 2 is a perspective view of a retainer made in accordance with the present invention a plurality of which are used in the collar of FIG. 1.
Figure 3:
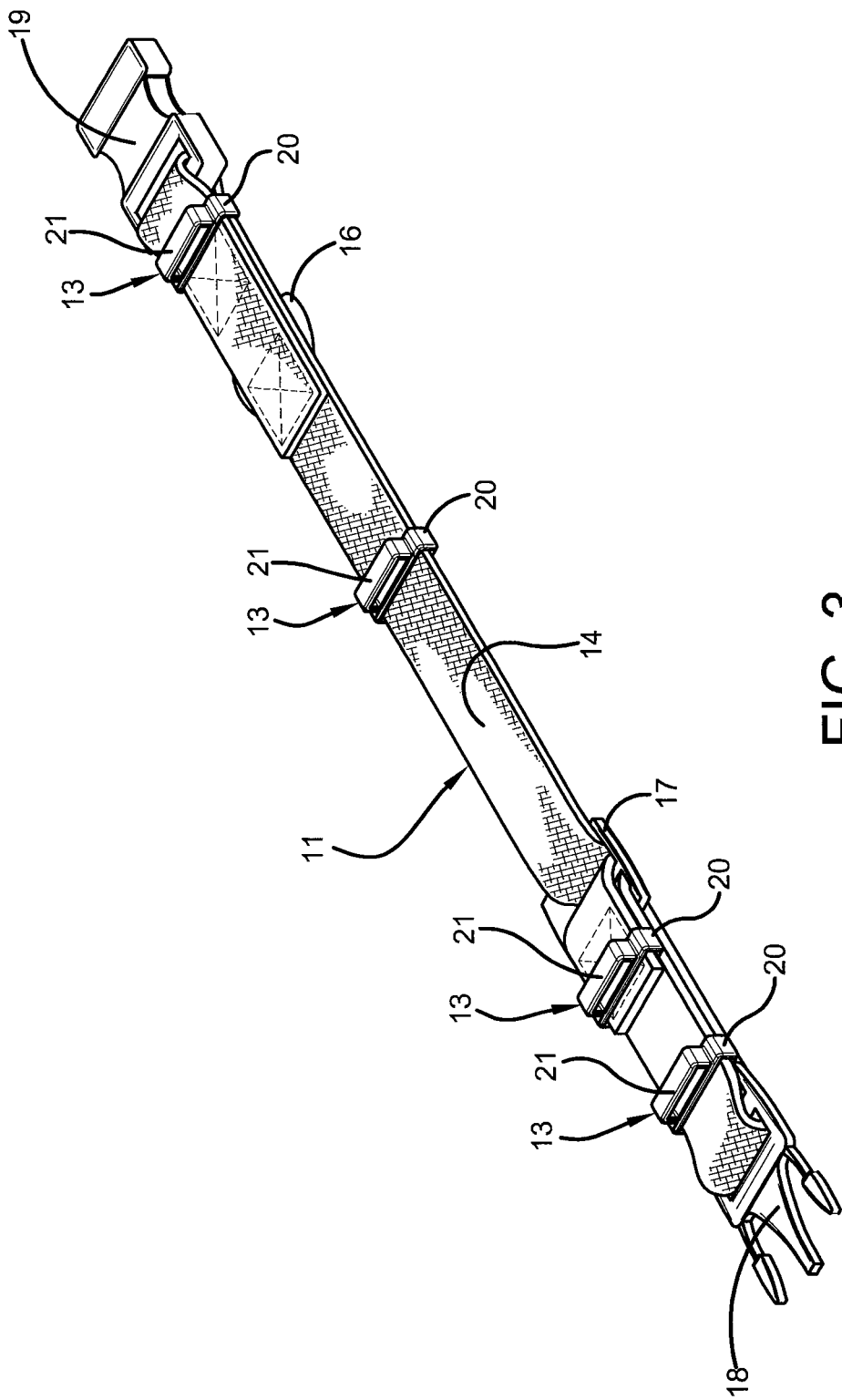
FIG. 3 is a perspective view of the first collar component of the collar of FIG. 1.

A pet collar made in accordance with the concepts of the present invention is generally indicated by the numeral 10 and is shown in FIG. 1. Collar 10 includes what can be a conventional pet collar generally indicated by the numeral 11 and shown in FIGS. 3 and 4, a strap 12 for protecting the pet from fleas or the like, and a plurality of retainers, each generally indicated by the numeral 13, to hold collar 11 and strap 12 together, one retainer 13 being shown in FIG. 2.

Collar 11 includes an elongate strap 14 which can be made of a nylon, leather, or like fabric. The bottom side 15 of strap 14 (as viewed in the drawings) can be adorned with an aesthetic pattern or which can carry identifying indicia of the pet, such as the name of the pet. Side 15 of strap 14 also carries a D-ring 16, or the like so that a leash can be connected to collar 10. Side 15 may also be provided with a slide 17 to adjust the length of strap 14. The ends of strap 14 are adapted to be connected to each other to position collar 10 on the neck of the pet. To that end, one end of strap 14 is provided with the male portion 18 of a buckle connector, and the other end of strap 14 is provided with a female portion 19 of the buckle connector. When portions 18 and 19 are connected to form the collar, side 15 of strap 14 is exposed to reveal the potentially aesthetic side of collar 10.

Strap 12 is an elongate item made of a material which protects the pet from infestation with fleas, ticks or the like. Such a strap is generally known as a "flea collar" and may be of the type sold by Bayer Aktiengesellschaft of Germany under the trademark SERESTO®.

Each retainer 13 is made of a resilient material, such as a thermoplastic elastomer or thermoplastic rubber, and in one embodiment includes a lower body portion 20 integrally formed with an upper body portion 21. Lower body portion 20 has an aperture or slot 22 formed therethrough. Slot 22 is sized to correspond to the cross-sectional size of strap 14. Upper body portion 21 is provided with an aperture or slot 23 formed therethrough. Slot 23 is generally parallel to slot 22 and is sized to correspond to the cross-sectional size of strap 12. In another embodiment, which may be preferable for small collars, there could be only one slot in the retainers 13 with both strap 14 and strap 12 being received in that slot.

Figure 4:
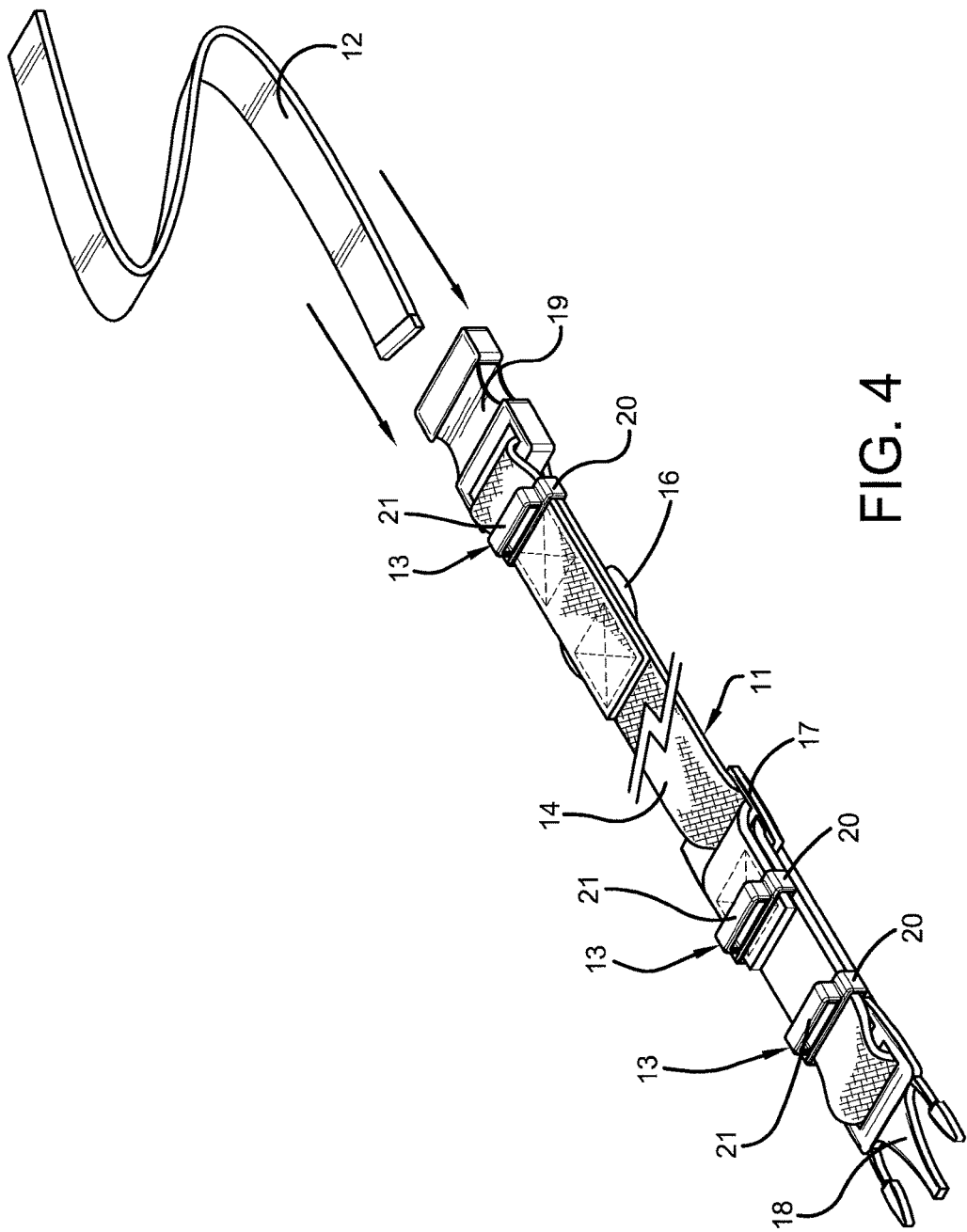
FIG. 4 is a fragmented perspective view showing the manner in which the second collar component of the collar of FIG. 1 is connected to the first collar component of FIG. 3.
Figure 5:
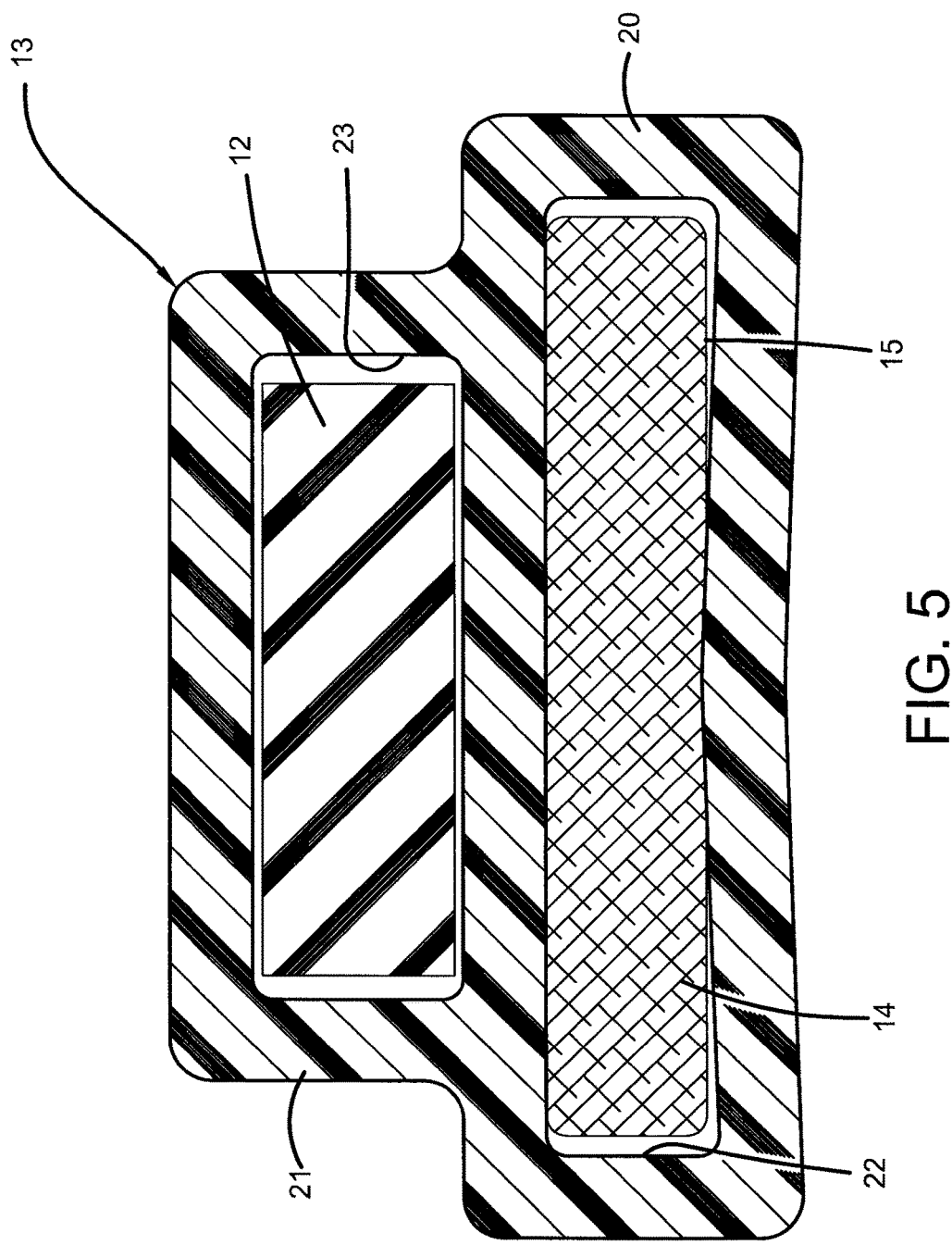
FIG. 5 is a sectional view taken substantially along line 5-5 of FIG. 1.

Collar 10 is assembled in the following manner. As collar 11 is being manufactured, a plurality of retainers 13 are threaded onto it by passing strap 11 through the slots 22 of each retainer 13. It is preferable to generally merely space the retainers 13 along the length of strap 11. The retainers 13 are positioned on strap 11 so that the slots 23 are on the side of the strap 11 which will be against the neck of the pet when worn. The material for strap 12 can be cut to the appropriate length and, as shown in FIG. 4, strap 12 is threaded through the slots 23 of retainers 13 to form the collar 10 of FIG. 1. When collar 10 is positioned around the neck of a pet, with portions 18 and 19 of the buckle connector attached, strap 12 will be under strap 14 and hidden from the sight of the observer. Strap 12 may then be attached to a leash or the like by means of D-ring 16.

It should thus be evident that a collar and retainer, as described herein, accomplishes the objects of the invention and otherwise substantially improves the art.

What is claimed is:

1. A collar for an animal comprising:
   a first elongate strap;
   a second elongate strap, wherein the width of the second strap is less than the width of the first strap, the second strap comprising a material which protects the pet from infestation with pests;
   a plurality of retainers, each said retainer comprising a first aperture formed by directly opposed first and second walls, and a second aperture being formed by said second wall and a third wall directly opposed to said second wall so that said first aperture is positioned adjacent to said second aperture, said first aperture being larger than said second aperture; and
   said first aperture receiving said first elongate strap, said second aperture receiving the second elongate strap;
   wherein the first elongate strap is configured to hide the second elongate strap.

2. The collar of claim 1, further comprising a ring attached to one side of said first elongate strap so that when the collar is on an animal, said ring is exposed.

3. The collar of claim 1, wherein said elongate strap has ends, each end being provided with a portion of a buckle such that the ends may be connected when the collar is on an animal.

4. A collar kit for an animal comprising:
   a first elongate strap;
   a second elongate strap, wherein the width of the second strap is less than the width of the first strap, the second strap comprising a material which protects the pet from infestation with pests;
   a plurality of retainers, each said retainer comprising a first aperture formed by directly opposed first and second walls, and a second aperture being formed by said second wall and a third wall directly opposed to said second wall so that said first aperture is positioned adjacent to said second aperture, said first aperture being larger than said second aperture; and
   said first aperture adapted to receive said first elongate strap, said second aperture adapted to receive the second elongate strap;
   wherein the first elongate strap is configured to hide the second elongate strap.

5. The kit of claim 4, further comprising a ring attached to one side of said first elongate strap so that when the collar is on an animal, said ring is exposed.

6. The kit of claim 4, wherein said elongate strap has ends, each end being provided with a portion of a buckle such that the ends may be connected when the collar is on an animal.

* * * * *